March 21, 1967    J. SCHNEIDER    3,309,846
HEATER-VENTILATOR

Filed May 21, 1964    4 Sheets-Sheet 1

Inventor:
Jürgen Schneider
By Spencer & Kaye
ATTORNEYS

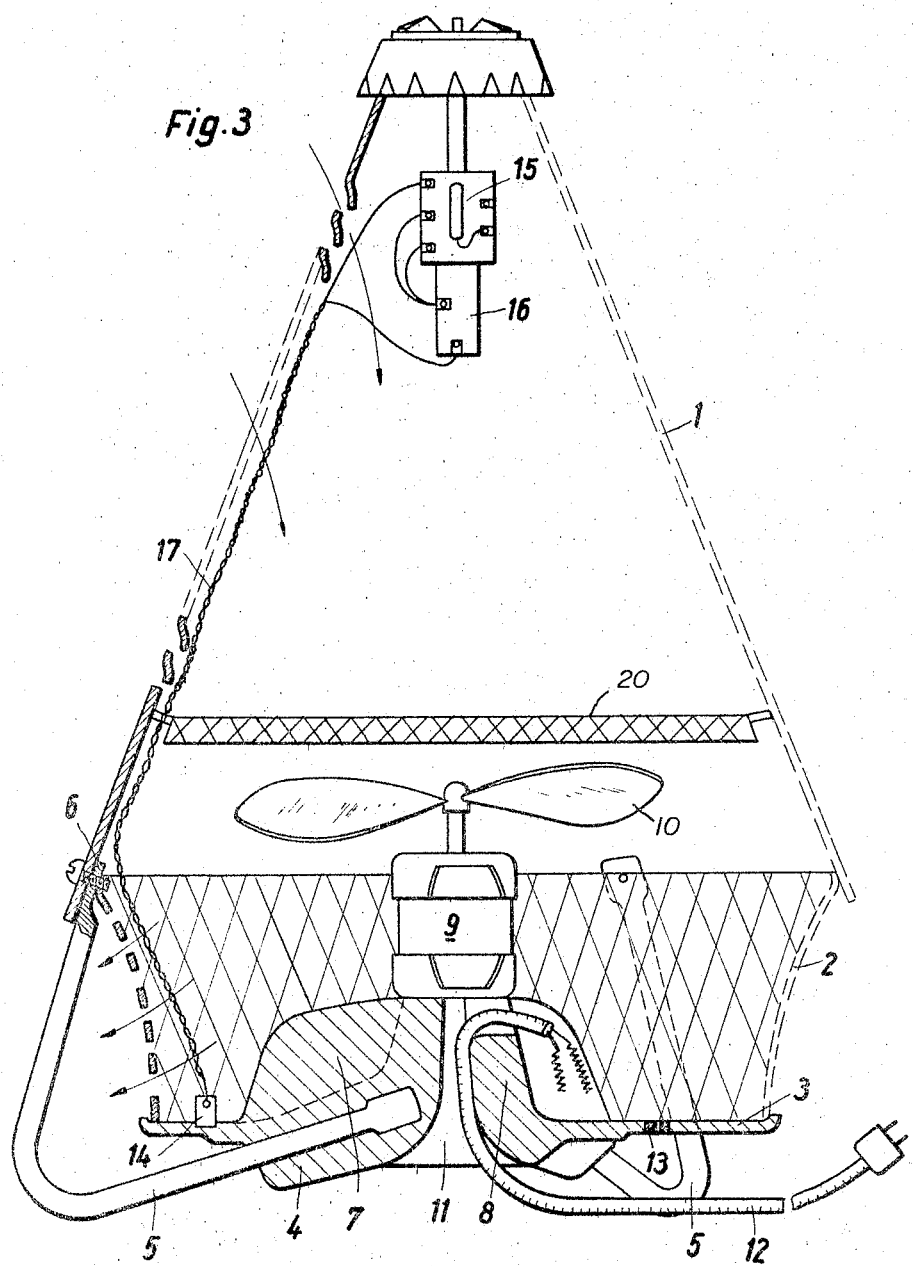

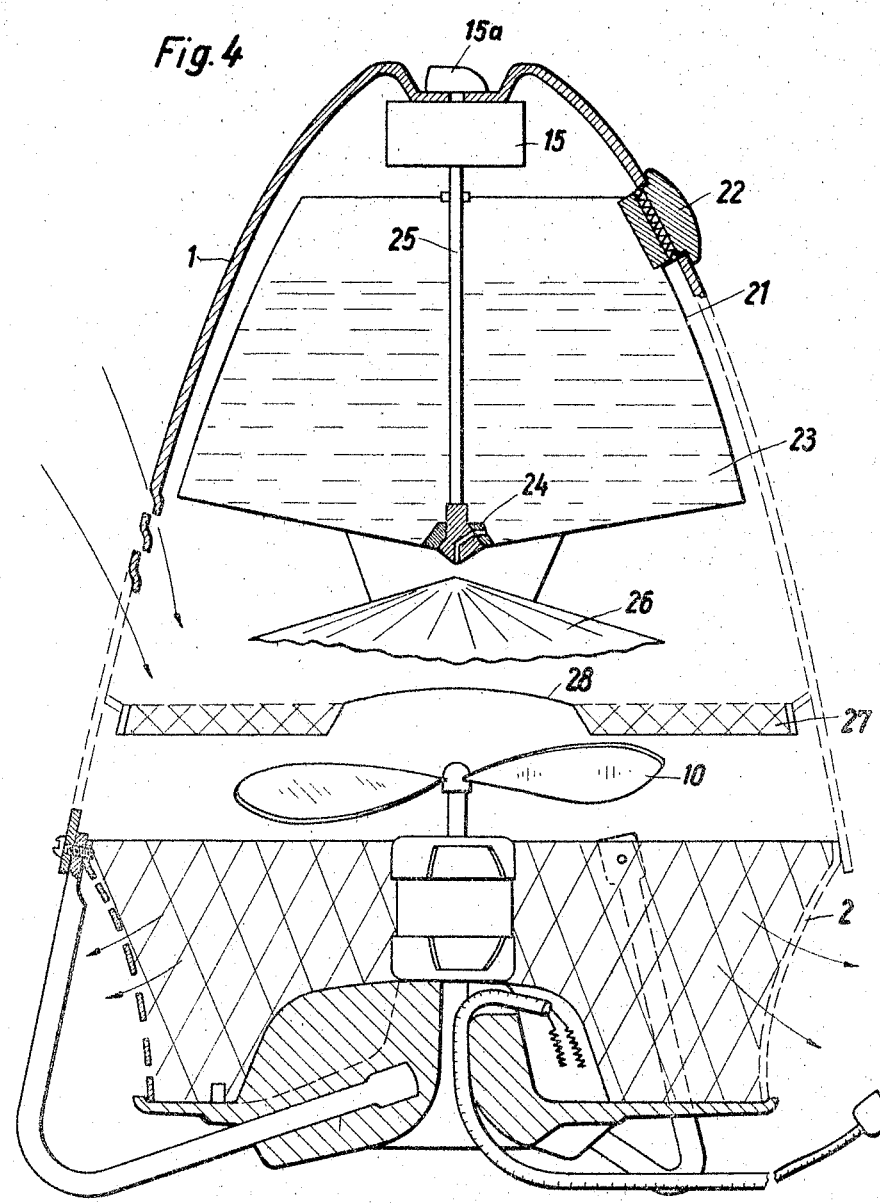

United States Patent Office 3,309,846
Patented Mar. 21, 1967

3,309,846
HEATER-VENTILATOR
Jurgen Schneider, 9 St. Michaelstrasse 59,
Siegen, Westphalia, Germany
Filed May 21, 1964, Ser. No. 369,328
Claims priority, application Germany, May 21, 1963,
Sch 33,315; May 24, 1963, Sch 33,789
12 Claims. (Cl. 55—233)

This present invention relates to a heater-ventilator, i.e. an electrical appliance containing a blower and a resistance-heating arrangement, which may be used as desired as a cooling fan or as a source of warm air for heating. The invention relates in particular to a heater-ventilator having a housing in which is located a downwardly-delivering axial blower. The air delivered by the blower is drawn in through apertures in the upper portion of said housing, and is forced out through apertures in the lower portion of said housing approximately horizontally and radially in all directions.

According to the invention, the housing of a ventilator-heater of this type is closed off at the bottom by a base plate made of a moulded substance (thermo-setting plastic), for example a formaldehyde-base plastic or melamin resin. On the upper side of said base plate and at the center there is a relatively thick, upwardly projecting extension carrying the electric motor driving the blower. Said extension may exhibit a bore expanding downwardly in the shape of a hopper, i.e., funnel shaped, and serving as a lead-in and buckling protection for a mains-connection cable.

At the bottom, the base plate may be provided with three opposing beads running approximately radially and forming an angle of about 120° in relation to each other, into which angularly bent metal parts are pressed, to serve both as feet for the heater-ventilator and for attaching other parts of the housing. The upper side of said base plate may also exhibit beads surrounding the pressed-in metal feet. Furthermore, air-guiding surfaces running radially and standing approximately vertically may be provided, in order to prevent a circular movement of the air supplied by the blower. Said air-guiding surfaces may be extensions of the beads laying on the upper side of the base plate, and may be pressed in one piece with said beads and the base plate proper.

Said base plate preferably serves also as a holder for the resistance-heating arrangement and for electric terminals for attachment of the various electrical connecting leads.

The upper side of the housing is preferably at least approximately in the form of a cone, a rotary paraboloid, or a rotary hyperboloid. The greatest diameter of the upper portion of the housing is preferably considerably smaller than the axial (perpendicular) dimension of the upper portion of said housing; for example, the ratio between the greatest diameter and the height of the upper portion of said housing may be between 0.5 and 0.25. The upper portion of said housing is preferably provided with approximately uniformly distributed air-inlet apertures. Between the upper portion of the housing and the base plate there is a lower housing portion tapering downwardly approximately in the form of a truncated cone and provided with air-outlet apertures.

The invention will now be explained in greater detail with the aid of non-limitative examples of embodiment in conjunction with drawings, wherein:

FIG. 3 is a sectional view according to FIG. 1 of a second example of embodiment of the invention, and FIG. 4 is a sectional view according to FIG. 1 of a third example of embodiment of the invention.

Figure 1:
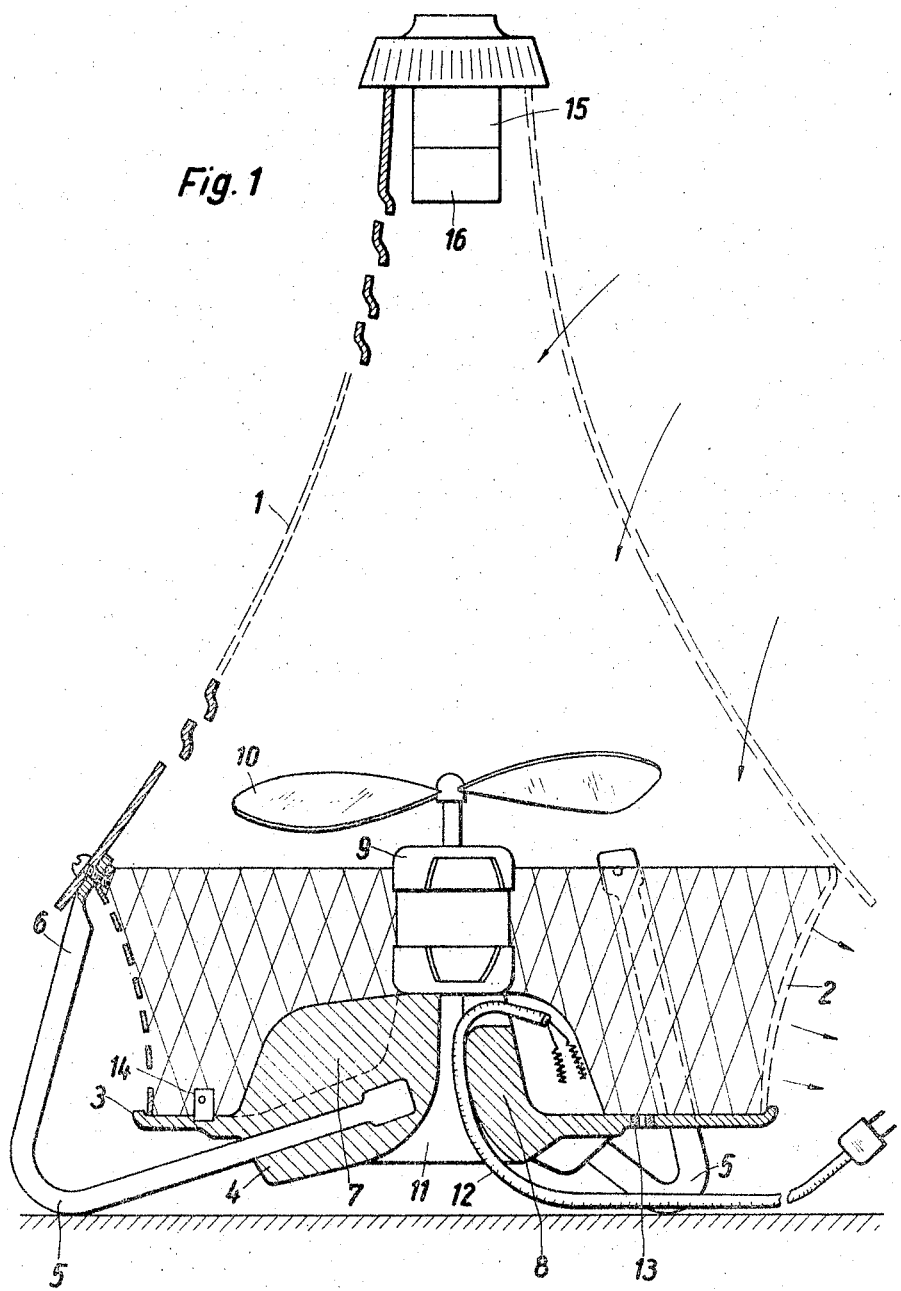
FIG. 1 is an axial section through a first form of embodiment of a heater-ventilator according to the invention.
Figure 2:
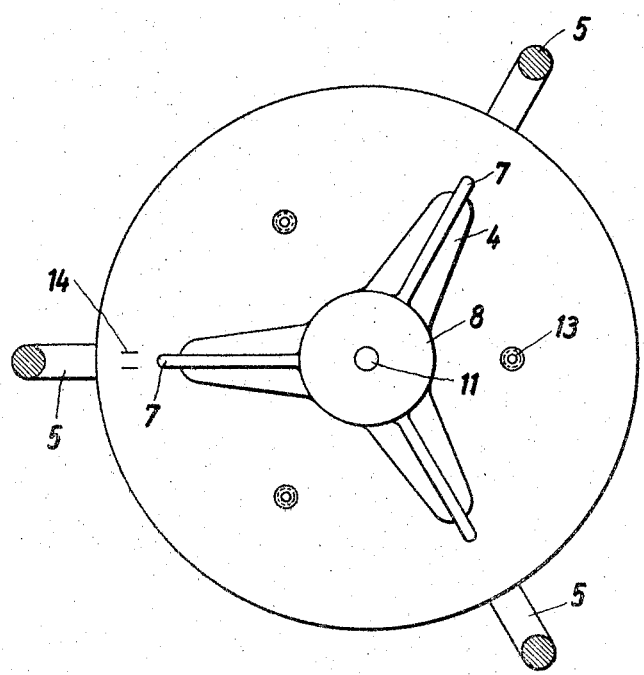
FIG. 2 is a plan view of the base plate of the heater-ventilator according to FIG. 1.

The somewhat simplified example of embodiment of the invention shown in FIG. 1 contains an upper housing portion 1, a lower housing portion 2 and a base plate 3 shown in plan view in FIG. 2. In the example of the illustrated embodiment, the upper portion 1 is in the shape of a rotary hyperboloid and is provided with air-inlet apertures. It may be made of a moulded material. Lower portion 2 of said housing, from which the air issues, may be made of a screen-like metal sheet and may be cylindrical, truncated-conical, or spherical in shape; in this example of the embodiment it has the shape of a rotary surface, the generatrix of which is an inwardly convex curve, the tangent to which runs at least almost vertically at the lower end.

The housing configuration shown in FIG. 1 has the advantage that the air is drawn approximately vertically through the upper portion of the housing and is ejected approximately horizontally through the lower portion of the housing, thus securing a good circulation of air, with no danger of the air ejected at the bottom being immediately drawn in again at the top.

The base plate shown in FIG. 1 in section and in FIG. 2 in plan consists of a plastic, e.g. a thermo-setting plastic with a formaldehyde base. Base plate 3 is approximately circular in shape and is provided with three beads set at 120° to each other, into which are pressed bent metal stirrups 5 having widened ends. Said metal stirrups 5 serve both as feet for the ventilator heater and for the attachment of the housing upper portion 1 and the housing lower portion 2, which are screwed to upper enlarged ends 6 of stirrups 5. On the upper side of base plate 3, beads 4 continue on as ribs 7 which serve both as mechanical stiffening and as air-guiding surfaces, opposing any twisting motion of the downwardly supplied air. At its center, the base or floor plate carries an upwardly projecting extension 8, to the upper end of which is attached an electric motor 9, the vertical shaft of which carries a downwardly-supplying blower arrangement 10. Extension 8 is provided with an axial bore 11 which expands downwardly in the shape of a hopper, i.e., funnel shaped, making possible the buckle-free introduction of a mains electric cable 12, which may thereby be led away radially in any desired direction. Also pressed or moulded into the base plate are nuts and connecting terminals, as shown by way of example at 13 and 14, for the attachment of a resistance-heating arrangement, not shown, surrounded by housing portion 2, as well as electrical connecting leads.

Fitted to the upper end of housing portion 1 is a switch 15, to the bottom of which is preferably a thermostat 16.

The example of embodiment of the invention illustrated in FIG. 3 corresponds, with certain exceptions which will be mentioned immediately, to the example of embodiment described in connection with FIGS. 1 and 2. Corresponding parts are therefore provided with the same reference numbers and are not explained again.

The heater-ventilator illustrated in FIG. 3 differs from that in FIGS. 1 and 2 in that the upper portion of the housing is of conical shape. This has the advantage that somewhat more space is available in the upper portion of the housing and that electrical connecting lines 17 between the switch and the thermostat, on the one hand, and the resistance-heating arrangement located at the bottom of the housing, on the other hand, are easier to lay. Furthermore there is sufficient space to install additional devices, for example an air filter 20.

The example of embodiment illustrated in FIG. 4 differs from those in FIGS. 1 and 3 above all in that the upper portion of the housing is of a dome-shaped convex configuration, i.e. is in the form of a rotary hyperboloid. This provides still more internal space, so that, for example, an arrangement for humidifying the air may be provided. For this purpose, a water tank 21 is fitted to upper housing portion 1, which may be filled through a lateral aperture which can be closed by means of a watertight plug 22. At the center of the approximately conical base 23 is an outlet valve 24 which is preferably mechanically coupled, via a rod 25, with operating switch 15 of the appliance which is controlled by the knob 15a. In this way it may be ensured that the water flows out through the valve 24 only when the appliance is switched on, and then only at certain stages of operation (e.g. high blower r.p.m.). Valve 24 includes a stationary outer member provided with a substantially radial passage, and a rotatable inner member mounted to be rotated by rod 25 with respect to the stationary member and provided with a passage having a substantially radial portion and an axial portion, the passages in the inner and outer members being illustrated in the drawing. The inner member is angularly positioned with respect to the outer member so that the substantially radial portion of the passage in the former will move into alignment with the passage in the latter when knob 15a has been rotated into a position corresponding to the high blower speed. The water drops on to an umbrella-like distributor 26 and thence on to a porous, annular element 27, which may consist, for example, of a plurality of layers of wire netting. Said water is evaporated by the flow of air passed by blower 10 through element 27. At its center, annular element 27 is closed with a solid member 28 in order to protect motor 9 against water spray.

The water tank may furthermore be fitted with a magnetic valve, not shown, which automatically closes when no current flows through the appliance. This prevents the outflow of any water when the appliance is switched off, for example by pulling out the mains plug.

The example of embodiment described may be varied in many different ways. The motor and/or the blower wheel may be located above air filter 20 (FIG. 3) or above the humidifier (FIG. 4). Moulded plastic feet may be used in place of stirrup-shaped feet 5 made of metal. In this case the housing may be built on to the disc-shaped portion of the base or floor plate. The housing need not be built in strictly rotational symmetry, but may be made in staged surfaces so that a pyramid-like shape results. In this case, the cross section of the housing perpendicular to its axis is in the form of a polygon.

What is claimed is:

1. A heater ventilator having a blower and comprising in combination:
a housing having an upwardly tapering upper portion provided with air inlet means and a lower portion provided with air outlet means for delivering air radially with respect to such blower in an approximately horizontal direction, a base plate formed of a molded substance mounted at the lower end of said housing and having a middle portion extending upwardly, said middle portion having a funnel shaped opening therethrough and having a cross-sectional area which diminishes in the upward direction, said base plate further having a lower surface including an annular outer portion and a funnel-shaped inner portion whose outer extremity is contiguous with said annular portion and whose inner extremity is contiguous with said funnel shaped opening of said middle portion to create a smooth transition between said annular portion and said funnel shaped opening, said base plate further having an upper surface having a plurality of substantially vertical ribs extending radially outward from said middle portion for mechanically stiffening said base plate and for preventing a circular movement of the air supplied by said blower, ventilator means including said blower and an electric motor, said electric motor being mounted upon an upper surface of said middle portion of said base plate and said blower extending upwardly from said motor, and an electric cable extending through and being laterally supported by, said funnel shaped opening to an upper side of said base plate and connected to said electric motor, said funnel shaped opening having gently curving walls for preventing the sharp bending of said cable and for permitting said cable to emerge from said opening in any radial direction.

2. Heater-ventilator according to claim 1, further comprising a plurality of stirrup shaped feet each having a first end, secured to said base plate, a middle portion extending outwardly and downwardly therefrom, and a second end extending upwardly and inwardly from said middle portion and connected to said housing between said upper and lower portions, and wherein said air inlet means are substantially uniformly spaced apart and said air outlet means are substantially uniformly spaced apart.

3. Heater-ventilator according to claim 2, characterized in that the areas of the base plate surrounding the portions of the feet in the base plate are thickened in a bead-like manner.

4. Heater-ventilator according to claim 1, characterized in that integral feet are moulded on to the under surface of the base plate.

5. Heater-ventilator according to claim 1, characterized in that the upper portion of the housing in axial section is outwardly concave.

6. Heater-ventilator according to claim 1, characterized in that the upper portion of the housing in axial section is approximately truncated-conical in section.

7. Heater-ventilator according to claim 1, characterized in that the upper portion of the housing in axial section is outwardly convex.

8. Heater-ventilator according to claim 1, characterized in that the upper portion of the housing in horizontal section is circular.

9. Heater-ventilator according to claim 1, characterized in that the upper portion of the housing in horizontal section is in the form of a polygon.

10. Heater-ventilator according to claim 1, characterized in that the upper portion of the housing contains an air filter.

11. Heater-ventilator according to claim 1, characterized in that the upper portion of the housing contains a water tank and a water-evaporating arrangement.

12. Heater-ventilator according to claim 1, characterized in that the vertical dimension of the upper portion of the housing is at least twice as great as its greatest diameter.

References Cited by the Examiner

UNITED STATES PATENTS

| | | | |
|---|---|---|---|
| 724,685 | 4/1903 | Evans | 239—524 X |
| 1,243,238 | 10/1917 | Adamo | 230—259 |
| 1,752,778 | 4/1930 | Brown et al. | 230—249.5 |
| 2,075,862 | 4/1937 | Myers | 261—142 |
| 2,498,342 | 2/1950 | Petticrew | 55—473 X |
| 2,607,863 | 8/1952 | MacFarland | 15—323 X |
| 2,759,713 | 8/1956 | Maniscalco | 261—142 |
| 2,768,782 | 10/1956 | Tateishi | 230—273 |
| 2,941,231 | 6/1960 | Von Grumbkow | 15—323 |
| 3,022,969 | 2/1962 | Fleckenstein et al. | 230—259 X |

W. B. KNIGHT, *Primary Examiner.*

ROBERT F. BURNETT, D. K. DENENBERG,
*Assistant Examiners.*